Patented May 22, 1951

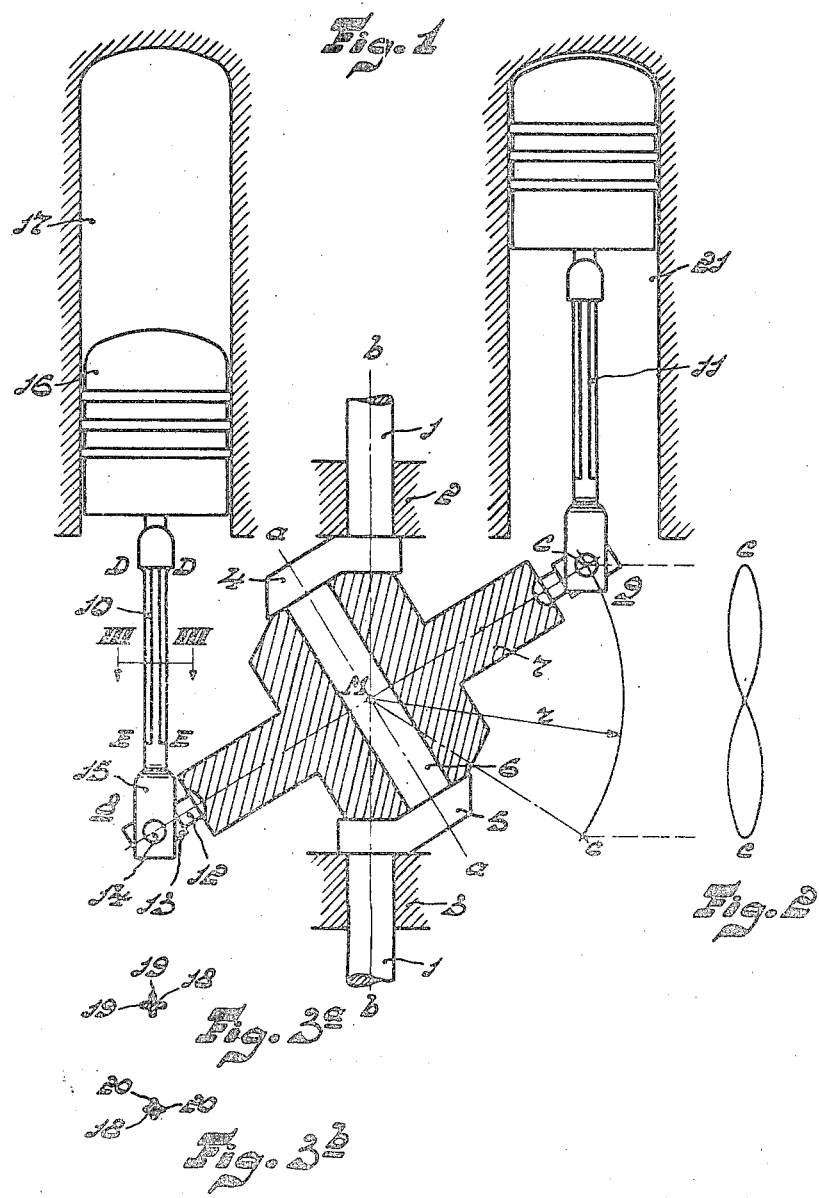

2,554,121

UNITED STATES PATENT OFFICE 2,554,121

DRIVING ROD FOR TUMBLER DISK DRIVING GEARS

Herre Rinia and Franciscus Lambertus van Weenen, Eindhoven, Netherlands, assignors to Hartford National Bank and Trust Company, Hartford, Conn., as trustee Application September 27, 1946, Serial No. 699,718
In the Netherlands February 21, 1946

3 Claims. (Cl. 74—60)

Our present invention relates to tumbler disc driving gears. More particularly, it concerns such driving gears, in which a special type of driving rods is employed, whereby torsional vibrations of large amplitudes are avoided.

The driving rods used in tumbler disc driving gears can be joined in various ways to the tumbler disc and the reciprocating members, for instance pistons, that are connected with the tumbler disc through the intermediary of these rods. For this purpose it is known to make use of ball-joints which have three degrees of freedom of motion, it is true, but are unsatisfactory in practice, because they are fundamentally not suitable for transmitting great forces. This is why in tumbler disc driving gears for connecting the tumbler disc to the driving rods, and of the driving rods to the reciprocating members, for instance pistons, use is sometimes made of Cardan joints which have two degrees of freedom of motion and are used in such manner that the driving rod, which is secured to the tumbler disc by means of such a Cardan construction, is movable in two planes extending through the longitudinal axis of the driving rod in question, which planes embrace an angle of 90°. In this case, however, the driving rod cannot rotate about its longitudinal axis. This means that during operation the driving rod, owing to the movement derived from the tumbler disc, will also slightly move to and fro about its axis, with the result that the member secured to this driving rod tends to perform the reciprocating movement and in addition a motion of rotation about its longitudinal axis.

During operation of the engine comprising this tumbler disc driving gear, the driving rod in question is under torsional stress owing to the mass of the said member. If the tumbler disc mechanism has a high speed, for instance more than 500 revolutions per minute and (or) the mass of the member secured to the driving rod is considerable, there is a risk of the occurrence of torsional vibrations which may be harmful to the driving rods.

The present invention has for its object to provide means by which the natural frequency of the vibrating system is shifted to a harmless range, with the result that the large amplitudes of the torsional vibration are prevented and the risk of breakage is largely reduced.

According to the invention the driving rod for a tumbler disc driving gear has the feature that the driving rod, at least over part of its length, has a cross section which consists of a central part and a certain number of flanks radially projecting therefrom. Thus, a substantial, if not the major, part of the mass of the rod is non-contiguous in the circular loci over much of the distance from the axis of the rod. Such lack of circular continuity of the mass at points removed from the axis of the rod results in a reduced torsional stiffness and an increased stiffness against bending, as compared with a rod of the same mass having a solid, circular cross-section.

By constructing the driving rod in this manner a low torsional stiffness can be obtained, while retaining sufficient resistance to bending, as a result of which the natural frequency of the system, which is in rotation-vibration and consists of the driving rod and the reciprocating member secured thereto e. g. a piston, is highly reduced. In this case the critical speed at which the large amplitudes may occur, is below the normal operation speeds and is only exceeded in starting up and stopping down the engine.

In order that the invention may be clearly understood and readily carried into effect it will now be described more fully with reference to the accompanying drawing, given by way of example.

Figure 1 represents diagrammatically a tumbler disc driving gear and the pistons coupled therewith which are movable in cylinders.

Figure 2 represents a side view of the path of the end of the tumbler disk as being figure-8 in form.

Figures 3a and 3b show the cross section of Figure 1 taken generally at line III—III.

The shaft 1 of the mechanism is supported in the bearings 2 and 3. This shaft has radially projecting parts 4 and 5 which are intercoupled through the portion 6 of the shaft. Upon rotation of the shaft 1, the center line of the portion 6 of the shaft consequently describes a conical surface of which the generatrix consists of the line $a$—$a$ and the axis is formed by the line $b$—$b$. On the part 6 of the shaft is seated the tumbler disc 7, which, upon rotation of the shaft 1, performs a tumbling movement, which is such that all or practically all points of the periphery of this disc describe a figure eight path. In the plane of the drawing the projections of these paths are indicated by the lines $c$—$c$; however, these paths also have a certain dimension at right angles to the plane of the drawing. Laterally viewed these paths have about the shape shown in Figure 2, it being pointed out that these paths extend on a spherical surface having the point of intersection M of the lines a—a and b—b as a centre and the distance of M from the geometric centre of the Cardan joints 8 and 9 referred to hereinafter as a radius ($=r$)

The driving rods 10 and 11 are coupled to the tumbler disc 7 through Cardan couplings 8 and 9. In the present case these Cardan joints consist of a pin 12 which is rigidly secured in the tumbler disc 7 and about which a bushing 13 is rotatable. At the outside the bushing 13 exhibits two journals diametrically opposing each other, of which in the drawing only the journal 14 is visible at the Cardan joint 8, and about which journals the forked end 15 of the driving rod 10 is movable. If the piston 16 is not in the cylinder 17 and consequently freely movable, the piston 16 and the driving rod 10 are movable, theoretically to an unlimited degree, in the plane of the drawing by pivoting the forked end 15 of the driving rod 10 on the journals of the bushing 13, and furthermore the bushing 13 with the driving rod 10 and the piston 16 are pivoted, theoretically to an unlimited degree of motion, on the pin 12.

Normally, however, the piston 16 is in the cylinder 17 and, as explained with reference to Figure 2, the figure eight paths of the geometric centres of the Cardan coupling have a certain size in a tangential direction. Owing to this the driving rods, during operation of the mechanism, will perform a reciprocating and at the same time a rotational movement which, as has already been stated above, may be harmful to the driving rods. To avoid this drawback, according to the invention, the portion of the driving rods between the planes D—D and E—E have a cross-section as shown diagrammatically in Figures 3a and 3b. The cross-section consists of the central portion 18 and the radial flanks 19 and 20 respectively. In this way the driving rod, in comparison with a driving rod having a round cross-section, has a much smaller torsional stiffness, so that the piston 16 will be much less capable of following the rotational movement of the section of the driving rod at the plane E—E about its longitudinal axis.

The cylinders 17 and 21 are represented very diagrammatically without the associated inlets and outlets. It may be the cylinders of a motor, pump, compressor or the like.

What we claim is:

1. A tumbler disc driving gear comprising in combination a tumbler disc having a Cardan joint at its periphery, a reciprocating member, and a driving rod connecting the Cardan joint and the reciprocating member, said driving rod having, at least over part of its length, a cross-section consisting of a solid central portion with a plurality of flanks radially projecting therefrom.

2. A tumbler disc driving gear comprising in combination a tumbler disc having a plurality of Cardan joints at its periphery, an equal number of reciprocating members, and an equal number of driving rods, each connecting one of said Cardan joints with one of said reciprocating members, all of said driving rods having a star-shaped cross-section over the greater part of their lengths.

3. A tumbler disc driving gear, as claimed in claim 1, wherein the driving rod over the greater part of its length has a cross-section consisting of a solid central portion with a plurality of symmetrically arranged flanks radially projecting therefrom, the radius of the solid central portion being less than the radial length of the projecting flanks.

HERRE RINIA.
FRANCISCUS LAMBERTUS van WEENEN.

REFERENCES CITED

The following references are of record in the file of this patent:

UNITED STATES PATENTS

| Number | Name | Date |
|---|---|---|
| 1,436,074 | Anderson | Nov. 21, 1922 |
| 1,625,804 | Hansson | Apr. 26, 1927 |
| 1,625,805 | Hansson | Apr. 26, 1927 |
| 2,097,138 | Steele | Oct. 26, 1937 |
| 2,236,738 | Swensen | Apr. 1, 1941 |
| 2,302,995 | Holmes | Nov. 24, 1942 |
| 2,436,908 | Van Weenan et al. | Mar. 2, 1948 |